(12) United States Patent
Hong et al.

(10) Patent No.: US 11,584,866 B2
(45) Date of Patent: Feb. 21, 2023

(54) SLIP COATING COMPOSITION FOR GLASS RUN OF VEHICLE

(71) Applicants: HYUNDAI MOTOR COMPANY, Seoul (KR); KIA MOTORS CORPORATION, Seoul (KR); HWASEUNG MATERIAL CO., LTD., Yangsan-si (KR)

(72) Inventors: SeokHyun Hong, Anyang-si (KR); Joon Chul Park, Suwon-si (KR); Sang Hyun Lee, Jeju-si (KR); Mi Yeong Jo, Gwangmyeong-si (KR); Sangkyun Ahn, Seoul (KR); Mu-Jung Lee, Busan (KR); Kyoung-Min Hong, Yangsan-si (KR); Young-Sic Kim, Yangsan-si (KR)

(73) Assignees: HYUNDAI MOTOR COMPANY, Seoul (KR); KIA MOTORS CORPORATION, Seoul (KR); HWASEUNG MATERIAL CO., LTD., Yangsan-si (KR)

( * ) Notice: Subject to any disclaimer, the term of this patent is extended or adjusted under 35 U.S.C. 154(b) by 158 days.

(21) Appl. No.: 17/153,044

(22) Filed: Jan. 20, 2021

(65) Prior Publication Data
US 2022/0089896 A1 Mar. 24, 2022

(30) Foreign Application Priority Data
Sep. 21, 2020 (KR) .......................... 10-2020-0121503

(51) Int. Cl.
*C09D 123/12* (2006.01)
*C09D 123/06* (2006.01)
*C08L 83/04* (2006.01)
*C08K 5/14* (2006.01)

(52) U.S. Cl.
CPC .............. *C09D 123/12* (2013.01); *C08K 5/14* (2013.01); *C08L 83/04* (2013.01); *C09D 123/06* (2013.01); *C08L 2205/03* (2013.01); *C08L 2207/04* (2013.01); *C08L 2207/068* (2013.01); *C08L 2310/00* (2013.01); *C08L 2312/00* (2013.01)

(58) Field of Classification Search
None
See application file for complete search history.

(56) References Cited

U.S. PATENT DOCUMENTS

2011/0034590 A1\* 2/2011 Kuhn .................. C08K 3/36
524/263

\* cited by examiner

*Primary Examiner* — Jeffrey D Washville
(74) *Attorney, Agent, or Firm* — McDonnell Boehnen Hulbert & Berghoff LLP (57) ABSTRACT

The present disclosure relates to a slip coating composition for glass run of a vehicle. More specifically, the present disclosure relates to a slip coating composition including: an olefin-based thermoplastic elastomer, polypropylene, and an ultra-high molecular weight polyethylene (UHMWPE) with a weight average molecular weight of $0.4 \times 10^6$ to $1 \times 10^6$ g/mol, and to a slip coating material formed of the composition, and according to the present disclosure, it is possible to improve a low friction coefficient, wear resistance, and color matching properties of the coating material.

8 Claims, 5 Drawing Sheets

FIG. 1A

Prior art

SLIP COATING COMPOSITION FOR GLASS RUN OF VEHICLE

CROSS REFERENCE TO RELATED APPLICATIONS

This application claims priority to and the benefit of Korean Patent Application No. 10-2020-0121503 filed in the Korean Intellectual Property Office on Sep. 21, 2020, the entire contents of which are incorporated herein by reference.

BACKGROUND

(a) Field

The present disclosure relates to a slip coating composition for a glass run of a vehicle. More particularly, the present disclosure relates to a slip coating composition that may improve a low friction coefficient, wear resistance, and color matching properties of a coating material by containing an olefin-based thermoplastic elastomer, polypropylene, and ultra-high molecular weight polyethylene (UHMWPE) of a specific molecular weight range, and to a slip coating material formed of the composition.

(b) Description of the Related Art

Conventionally, EPDM or PVC was mainly used as a material of a glass run body of a vehicle, while recently, cases in which a thermoplastic elastomer (TPE), which is known as an environmentally friendly material, have been used as a material of a glass run body of a vehicle are increasing. Since the thermoplastic elastomer is environmentally friendly, allows manufacturing costs to be reduced, and may provide performance at the same level as the existing EPDM material and PVC material, it may be suitably applied as a material for a glass run of a vehicle.

However, in order to apply the thermoplastic elastomer material to parts of medium and large vehicles, it is required to have a more improved level in terms of quality and performance. Currently, a problem that often occurs in a development process of a new vehicle is that a noise occurs during operation of a vehicle door glass, or a glass lifting operation is delayed due to heavy operation. This is also related to characteristics and quality of various parts that are in contact with the vehicle door glass. That is, depending on a curvature of a door panel, a thickness and roughness of the glass, a shape of the glass run, and a friction coefficient and thickness of a slip coating, lifting and lowering operations for opening and closing the vehicle glass may become unstable, and accordingly, operation noise and operation heaviness may occur.

In order to solve this problem, a friction coefficient of the glass run slip coating material should be lowered as much as possible so that the door glass may smoothly and stably operate during its opening and closing operations. In addition, the slip coating material should be able to be maintained for a long time without a change in appearance or thickness due to wear, and as an aesthetic standard of consumers increases, it is necessary to further increase appearance quality by improving color matching between a slip coating portion and a main body of the vehicle glass run. Therefore, there is a need for a slip coating composition that may form a slip coating material with an improved low friction coefficient and wear resistance performance and an improved appearance characteristic.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a slip coating composition that may improve a low friction coefficient, wear resistance, and color matching properties of a coating material by containing an olefin-based thermoplastic elastomer, polypropylene, and an ultra-high molecular weight polyethylene of a specific molecular weight range, and to provide a slip coating material formed of the composition.

An embodiment of the present disclosure provides a slip coating composition for a glass run of a vehicle, including: an olefin-based thermoplastic elastomer; polypropylene; and an ultra-high molecular weight polyethylene (UHMWPE) with a weight average molecular weight of $0.4 \times 10^6$ to $1 \times 10^6$ g/mol.

The olefin-based thermoplastic elastomer may be a cross-linked thermoplastic vulcanizate (TPV).

The ultra-high molecular weight polyethylene may be included in an amount of 10 to 20 wt % with respect to a total weight of the composition.

The olefin-based thermoplastic elastomer may be included in an amount of 10 to 30 wt % with respect to a total weight of the composition.

The polypropylene may be included in an amount of 20 to 50 wt % with respect to a total weight of the composition.

The composition may further contain a silicone masterbatch, and the silicone masterbatch contains polyethylene and dimethylsiloxane.

The silicone masterbatch may be included in an amount of 10 to 30 wt % with respect to a total weight of the composition.

The composition may further contain a peroxide cross-linking agent.

The composition may further contain one or more of a polypropylene wax, a pigment, an ultraviolet ray blocking agent, and an anti-oxidant.

Another embodiment of the present disclosure provides a slip coating material formed by co-extruding the slip coating composition for the glass run of the vehicle with a vehicle glass run base.

The vehicle glass run base may be a crosslinked thermoplastic vulcanizate (TPV)-based base.

The following effects may be achieved by using a slip coating composition and a slip coating material formed of the same according to the present disclosure.

It is possible to suppress formation of aggregates due to aggregation between particles by improving dispersibility of particles in a composition, and microprotrusions with maximum line contact may be formed on a coating surface instead of the conventional general protrusions (embossings).

It is possible to provide a matte uniform color to a slip coating portion through uniform dispersion of particles in a composition, and appearance quality of the slip coating portion may be improved by excellent color matching with a glass run main body.

A low friction coefficient characteristic of a slip coating portion is further improved, so that when a door glass is raised and lowered, no operation noise or operation heaviness occur, and it may smoothly and stably operate.

As wear resistance of a slip coating portion is further improved, it is not easily worn even when a door glass is frequently moved up and down, and a coating with good performance may be maintained for a long time without change in appearance and thickness of a slip coating material.

DETAILED DESCRIPTION

The technical terms used herein are to simply mention a particular embodiment and are not meant to limit the present disclosure. The terminologies used herein are just to illustrate a specific exemplary embodiment, but are not intended to limit the present disclosure. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other specific features, regions, numbers, operations, elements, components, and/or groups may exist or may be added.

The present disclosure will be described more fully hereinafter with reference to the accompanying drawings, in which exemplary embodiments of the disclosure are shown. As understood by those skilled in the art, the following embodiment may be modified in various ways without departing from the concept and scope of the present disclosure. As those skilled in the art would realize, the described embodiment may be modified in various different ways, all without departing from the spirit or scope of the present disclosure.

A slip coating composition for a glass run of a vehicle according to an embodiment of the present disclosure includes an olefin-based thermoplastic elastomer, polypropylene, and an ultra-high molecular weight polyethylene with a weight average molecular weight of $0.4 \times 10^6$ to $1 \times 10^6$ g/mol.

In the slip coating composition for a glass run of the vehicle according to the embodiment of the present disclosure, the olefin-based thermoplastic elastomer is preferably the same olefin-based thermoplastic elastomer as a material used for a glass run main body in terms of improving dispersibility of particles in the composition and color matching with the glass run main body. The olefin-based thermoplastic elastomer may be a crosslinked thermoplastic vulcanizate (TPV), and specifically, it may be a fully crosslinked TPV, for example, may preferably be a TPV that has a shore A hardness of 60 to 65, a melt index of about 8 g/10 min (230° C., a load of 10 kg), and a specific gravity of 0.96 or less. Since the fully crosslinked TPV has strong plasticity, it is advantageous in preventing cracks from external impacts or preventing folding marks (pleats) when mounted on a vehicle door, and simultaneously, the fully crosslinked TPV may improve color matching with the main body according to a crosslinking degree characteristic of the crosslinked TPV.

The slip coating composition for a glass run of the vehicle according to the embodiment of the present disclosure may include 10 to 30 wt % of the olefin-based thermoplastic elastomer with respect to a total weight of the composition in order to prevent the slip coating from being bent or contracted during extrusion processing. When the olefin-based thermoplastic elastomer is used in an amount of less than 10 wt %, since a crystalline resin such as high-crystalline polypropylene is excessively added, a bending and contracting phenomenon may occur during extrusion processing, while, when the olefin-based thermoplastic elastomer is used in excess of 30 wt %, wear resistance may be deteriorated, resulting in degradation in ascending/descending durability quality of the door glass. Specifically, the olefin-based thermoplastic elastomer may be included in an amount of 15 to 25 wt % with respect to the total weight of the composition, and more specifically, the olefin-based thermoplastic elastomer may be included in an amount of 18 to 22 wt % with respect to the total weight of the composition.

In the slip coating composition for glass run of the vehicle according to the embodiment of the present disclosure, the polypropylene has very good dimensional stability during extrusion processing at high temperatures, and thus stable workability and high productivity may be maintained, and since the polypropylene needs excellent wear resistance and mechanical properties due to its high stiffness properties, highly crystalline polypropylene is preferred. The highly crystalline polypropylene, for example, polypropylene in a form of a homopolymer having a melt index of 3.2 g/10 min (230° C., a load of 10 kg) and a density of 0.90 g/cm$^3$ or less, may be preferably used.

The slip coating composition for a glass run of the vehicle according to the embodiment of the present disclosure may include 20 to 50 wt % of the polypropylene with respect to the total weight of the composition to improve wear resistance and durability of the slip coating and to have hardness in an appropriate range. When the polypropylene is used at less than 20 wt %, the mechanical properties of the finished product, that is, hardness, tensile strength, elongation, etc., may decrease overall, and durability and wear resistance may decrease, while, when the polypropylene is used in an amount greater than 50 wt %, the hardness may excessively increase to not be suitable for products, and it may be difficult to be molded into a product due to poor flowability thereof.

In the slip coating composition for a glass run of the vehicle according to the embodiment of the present disclosure, a weight average molecular weight of the ultra-high molecular weight polyethylene (UHMWPE) is preferably $0.4 \times 10^6$ to $1 \times 10^6$ g/mol to improve dispersibility of particles in the composition, a low coefficient of friction characteristic of the slip coating portion, and color matching with the glass run main body, and is more preferably $0.4 \times 10^6$ to $0.8 \times 10^6$ g/mol, $0.5 \times 10^6$ to $0.7 \times 10^6$ g/mol, or $0.5 \times 10^6$ to $0.6 \times 10^6$ g/mol.

When using ultra-high molecular weight polyethylene having a weight average molecular weight in the above range, since the dispersibility of the particles in the composition is improved, it is possible to suppress formation of aggregates due to aggregation between particles, and it is possible to form fine protrusions with maximized line contact instead of conventional general protrusions (embossings) on a coating surface thereof. Accordingly, the low friction coefficient characteristic of the slip coating portion may be further improved, and diffused reflection may be induced by the fine protrusions to improve glossiness. When the weight average molecular weight of the ultra-high molecular weight polyethylene is less than $0.4 \times 10^6$ g/mol, it is difficult to improve the low friction coefficient properties without forming protrusions on the coating surface, and when the door glass is moved up and down for opening and closing, intermittent noises and operation heaviness may occur. When the weight average molecular weight of the ultra-high molecular weight polyethylene exceeds $1.0 \times 10^6$ g/mol, the friction coefficient may be relatively high due to the formation of general embossed or rough protrusions on the coating surface, and when the door glass is moved up and down for opening and closing, noises or operation heaviness may occur, and color matching with the glass run main body may also be poor.

In addition, the ultra-high molecular weight polyethylene has a density of 0.90 to 0.95 g/cm$^3$, an average particle size thereof may be 40 to 125 μm, and it is preferable that the average particle size thereof is 100 to 125 μm, of which 125 μm is most preferable. When the average particle size thereof is less than 40 μm, while a slip coating compound is extruded, the fine particles are not dispersed but are aggregated therebetween to form sporadic embossing on the coating surface, and larger aggregates cause surface defects (spots, fisheyes), and when the average particle size thereof exceeds 125 μm, excessively coarse protrusions are formed on the coating surface, resulting in noises and operation heaviness, and it negatively affects the appearance of the product.

The vehicle glass run slip coating composition according to the embodiment of the present disclosure may include 10 to 20 wt % of the ultra-high molecular weight polyethylene with respect to a total weight of the composition. When the ultra-high molecular weight polyethylene is used at less than 10 wt %, sporadic protrusions are formed on the coating surface, resulting in increased frictional resistance and unsatisfactory appearance quality. When the ultra-high molecular weight polyethylene is used in excess of 20 wt %, the hardness thereof excessively increases to not be suitable for the product, and the flow of the composition is poor, so that it is not molded into a product, and when the door glass is moved up and down for opening and closing, operational noises may occur. Specifically, the ultra-high molecular weight polyethylene may be included in an amount of 12 to 18 wt % with respect to the total weight of the composition, and more specifically, the ultra-high molecular weight polyethylene may be included in an amount of 14 to 16 wt % with respect to the total weight of the composition.

The vehicle glass run slip coating composition according to the embodiment of the present disclosure may further include a silicon masterbatch. The silicone masterbatch is preferably a self-lubricating silicone masterbatch, and may be, for example, a mixture of polyethylene and dimethylsiloxane. The self-lubricating silicone masterbatch has a merit that a method of addition is easier than that of oil-type silicone, and when added to the slip coating composition, a lubrication component is transferred to the coating surface to improve the slip property.

The vehicle glass run slip coating composition according to the embodiment of the present disclosure may include 10 to 30 wt % of the silicone masterbatch with respect to the total weight of the composition. When the silicone masterbatch is used in an amount of less than 10 wt %, a scratch may occur on the coating surface due to insufficient self-lubrication, or operation noise may occur. When the silicone masterbatch is used in an amount exceeding 30 wt %, stickiness and whitening occur on the outer surface of the product, a preparation unit price increases, and a silicone masterbatch may be transferred in extruder dies during extrusion.

The vehicle glass run slip coating composition according to the embodiment of the present disclosure may further include a crosslinking agent. The crosslinking agent is more environmentally friendly than a phenolic resin crosslinking agent, and a peroxide crosslinking agent that is strong against yellowing and moisture impregnating is preferable, and for example, 2,5-dimethyl-2,5-di-(tert-butylperoxy)-hexane may be used.

The vehicle glass run slip coating composition according to the embodiment of the present disclosure may include 0.01 to 1 wt % of the crosslinking agent with respect to the total weight of the composition. When the crosslinking agent is used in less than 0.01 wt %, wear resistance and mechanical properties may be deteriorated due to non-crosslinking, and when used in excess of 1 wt %, the surface of the product may become rough due to over-crosslinking and appearance spotting may occur.

The vehicle glass run slip coating composition according to the embodiment of the present disclosure may further include a polypropylene wax in order to provide processing preparation and luxury to product appearance during compound processing. The polypropylene wax may be included in an amount of 1 to 3 wt % with respect to the total weight of the composition. When the polypropylene wax is used in an amount of less than 1 wt %, fillers and atomic materials, for example calcium carbonate, may not be properly dispersed, which may degrade processability, and when it is used in excess of 3 wt %, mass transfer of low-molecular materials such as anti-oxidants or processing preparation oils may occur, or high gloss may occur, resulting in unsatisfactory appearance quality of the coating material.

The vehicle glass run slip coating composition according to the embodiment of the present disclosure may further include a pigment. As the pigment, a black pigment, for example, a black pigment masterbatch containing 20 to 25% of carbon black and 75 to 80% of polyethylene, may be used to improve color matching with the glass run main body. The pigment may be included in an amount of 1 to 3 wt % with respect to the total weight of the composition. When the pigment is used in an amount of less than 1 wt %, it is difficult to realize enough colors suitable for vehicle exterior parts, and when it is used in excess in 3 wt %, the manufacturing cost may increase and the flowability of the composition may be poor, so that a desired color may not be realized or processability may be degraded.

The vehicle glass run slip coating composition according to the embodiment of the present disclosure may further include an ultraviolet ray blocker. The ultraviolet ray blocker may be a masterbatch form of an ultraviolet ray blocker containing a benzotriazole-based UV absorber and/or an oligomeric hindered amine light stabilizer (HALS) type of UV stabilizer. The ultraviolet ray blocker masterbatch may be included in an amount of 1 to 3 wt % with respect to the total weight of the composition. When the ultraviolet ray blocker masterbatch is used in an amount of less than 1 wt %, whitening and microcracks may occur due to UV attack, and when it is used in excess of 3 wt %, the low molecular weight ultraviolet ray blocker may be transferred to the surface, so that whitening may occur on the product surface.

The vehicle glass run slip coating composition according to the embodiment of the present disclosure may further include an anti-oxidant. As the anti-oxidant, a phenolic anti-oxidant, a phosphorus anti-oxidant, or a phosphite anti-oxidant may be used, and particularly, a phenolic antioxidant, for example, tetrakis[methylene-3-(3,5-di-tert-butyl-4-hydroxyphenyl)propionate]methane may be used. The anti-oxidant may be included in an amount of 1 to 3 wt % with respect to the total weight of the composition. When the anti-oxidant is used in an amount of less than 1 wt %, physical properties and long-term reliability of the finished product may be degraded due to high temperature deterioration, and if it is used in excess in 3 wt %, the manufacturing cost of the product increases, and unreacted anti-oxidants may cause whitening of the appearance.

The vehicle glass run slip coating composition according to the embodiment of the present disclosure may further include additional additives such as a plasticizer.

The slip coating material according to another embodiment of the present disclosure may be formed by co-extrusion of the vehicle glass run slip coating composition with a vehicle glass run base. The co-extrusion may be performed by using, for example, a quadruple single extruder (soft (lip), hard (core), soft coating, and hard coating). The co-extrusion process may simplify the product manufacturing process, and may improve the durability and wear resistance of the finished vehicle glass run product.

In the slip coating material according to the embodiment of the present disclosure, the vehicle glass run base co-extruded with the vehicle glass run slip coating composition may be a crosslinked thermoplastic elastomer (TPV)-based base. Specifically, the base may be a high elastic thermoplastic olefin-based elastomer having a shore A hardness of 70 to 77, and a restoring force thereof may be 30% or less at a high temperature (70° C.×22 h).

EXAMPLE EMBODIMENT

Hereinafter, a preferred embodiment will be described to aid in understanding of the present disclosure. The following embodiment is merely illustrative of the present disclosure, and a scope of the present disclosure is not limited to the following embodiment.

Embodiment 1 and Comparative Example 1 to 6

A vehicle glass run slip coating composition was prepared with components and mixing amounts shown in Table 1 below (unit: wt %). Subsequently, the prepared slip coating composition was co-extruded with a vehicle glass run base (TPV system) by using a quadruple single extruder to prepare slip coating materials of Embodiment 1 and Comparative Examples 1 to 6.

TABLE 1

| Component | | Comparative Example 1 | Comparative Example 2 | Comparative Example 3 | Comparative Example 4 | Comparative Example 5 | Embodiment 1 | Comparative Example 6 |
|---|---|---|---|---|---|---|---|---|
| Ultra-high molecular weight Polyethylene | $2 \times 10^6$ g/mol, 40 μm | 15 | | | | | | |
| | $2 \times 10^6$ g/mol, 6 μm | | 15 | | | | | |
| | $2 \times 10^6$ g/mol, 125 μm | | | 15 | | | | |
| | $5 \times 10^6$ g/mol, 125 μm | | | | 15 | 10 | | |
| | $0.6 \times 10^6$ g/mol, 125 μm | | | | | 5 | 15 | |
| | $0.3 \times 10^6$ g/mol, 125 μm | | | | | | | 15 |
| High crystalline homo-polypropylene | | 30 | 30 | 35 | 40 | 40 | 40 | 40 |
| Olefin-based thermoplastic elastomer | | 20 | 20 | 20 | 15 | 20 | 20 | 20 |
| Peroxide crosslinking agent | | 0.1 | 0.1 | 0.1 | 0.1 | 0.1 | 0.1 | 0.1 |
| Silicone masterbatch | | 10 | 10 | 10 | 10 | 10 | 10 | 10 |
| Anti-oxidant and ultraviolet ray blocker | | 2.9 | 2.9 | 2.9 | 2.9 | 2.9 | 2.9 | 2.9 |
| Other additives (plasticizer, etc.) | | 22 | 22 | 17 | 17 | 12 | 12 | 12 |

UHMWPE: Comparative Example 1-3 is Mitsui's MIPELON ™, Comparative Examples 4 to 6 are KPIC's with a molecular weight of $0.3 \times 10^6$ to $5 \times 10^6$ g/mol and density of 0.90 to 0.95 g/cm³, and Embodiment 1 is KPIC's U010 PE500
Olefin-based thermoplastic elastomer: Hwaseung Material's 65BKM (hardness of 60 to 65 A, specific gravity of 0.96, melt index of 8 g/10 min)
High crystalline homo-polypropylene: KPIC's 5014L HPT-1 (melting index of 3.2 g/10 min, density of 0.90 g/cm³)
Peroxide crosslinking agent: Atochem's Luperox ® 101-50D, purity of 50%, specific gravity of 1.08.
Silicone masterbatch: Dow Corning's ® MB50-002 MASTER BATCH (polyethylene of 50%, dimethylsiloxane of 50%)
PP Wax: LION CHEMTECH's L-C 502N (specific gravity of 0.88 to 0.90, softening point of 161° C.)
Ultraviolet ray blocker: Benzotriazole-based UV absorber and oligomer HALS type of UV stabilizer (BASF)
Anti-oxidant: Songwon Industries' SONGNOX ® 1010 (tetrakis[methylene-3-(3,5-di-tert-butyl-4-hydroxyphenyl)propionate]methane)

Test Example 1

For Embodiment 1 and Comparative Examples 1 to 6, the surface appearance, color matching with TPV base, wear resistance, friction coefficient, noise occurrence, and operation heaviness were measured by the following methods, and the results are shown in Table 2 below.

① For the surface appearance, the appearance of the product was evaluated when the slip coating material was molded in the glass run manufacturing process of an actual commercially available vehicle.

② The color matching with the TPV base was compared and evaluated after measuring the color difference (*L value) and glossiness of the base portion and the slip coating portion of the product appearance.

③ The static and dynamic friction coefficients were measured in the condition of a speed of 15 cm/min, a test weight of 1000 g, a temperature of 23° C., and humidity of 50%.

④ The wear resistance was evaluated once every 1000 times for the durability of the glass run coating material molded while being repeated with a weight of 3 kg.

⑤ For the noise occurrence, it was confirmed whether the noise occurred by inducing compression between the vehicle glass run and the molded glass run while sprinkling water on general glass and tinted glass.

⑥ Operation heaviness induced compression between the vehicle glass run and the molded glass run, and the moving up and down speed and the operation current values were recorded.

1. In addition, in Comparative Examples 1 and 2, the operation heaviness occurred, in Comparative Examples 3 and 4, the color matching with the glass run base was poor and the operation noise and operation heaviness occurred, and in Comparative Example 6, the intermittent noise and operation heaviness also occurred.

Test Example 2

Figure 1A:
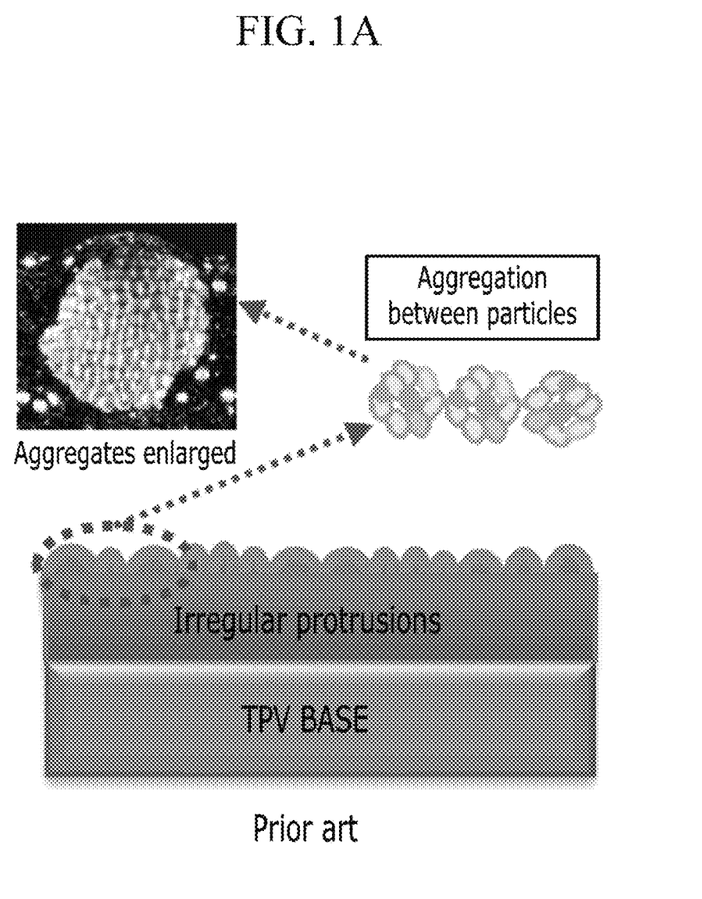
FIG. 1A illustrates a schematic view of degrees of dispersion of protrusions and depressions and of particles formed on surfaces of slip coating portions when using a conventional slip coating composition.
Figure 1B:
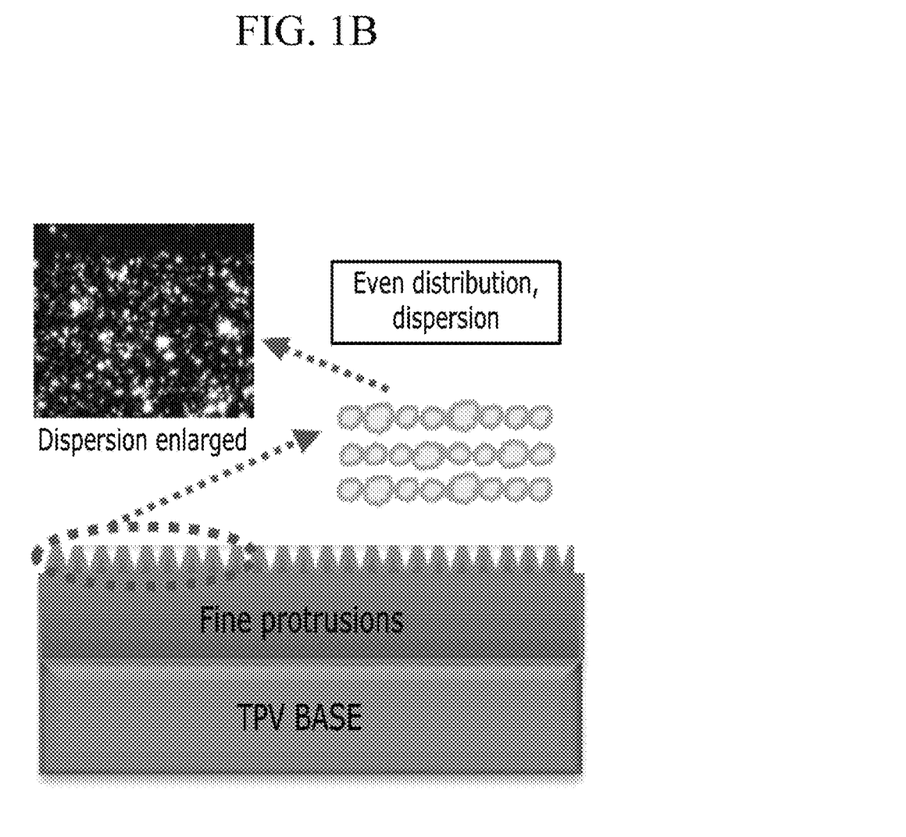
FIG. 1B illustrates a schematic view of degrees of dispersion of protrusions and depressions and of particles formed on surfaces of slip coating portions when using a slip coating composition according to the present disclosure.
Figure 2A:
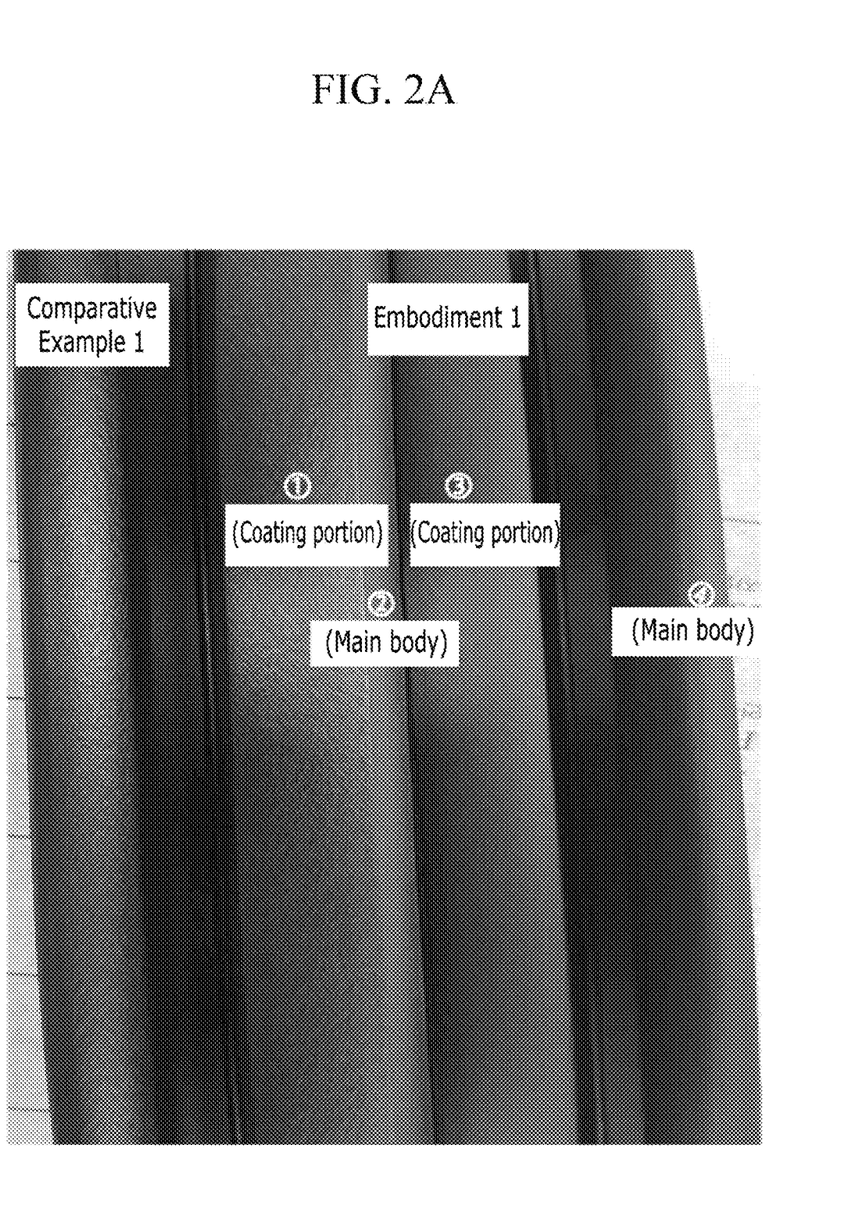
FIG. 2A illustrates a photograph comparing respective appearances of coating portions and main bodies of Embodiment 1 and Comparative Example 1.
Figure 2B:
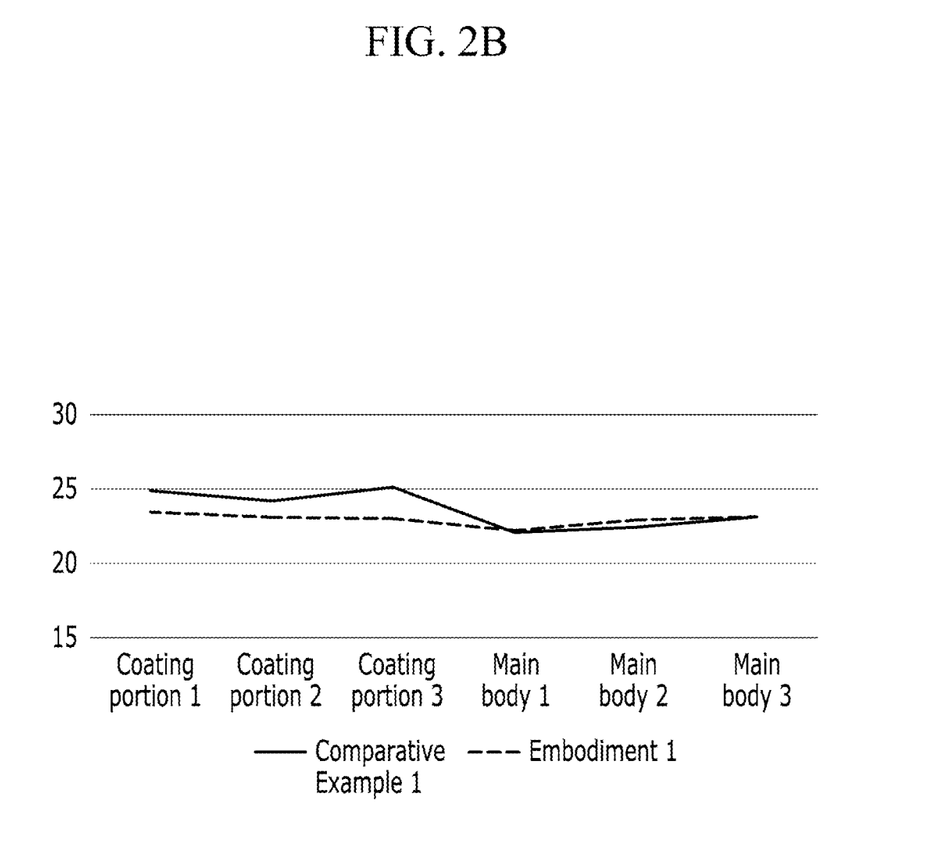
FIG. 2B and FIG. 2C illustrate graphs of results obtained by respectively measuring an appearance color difference value (*L value) and appearance glossiness three times for respective coating portions and main bodies of Embodiment 1 and Comparative Example 1.
Figure 2C:
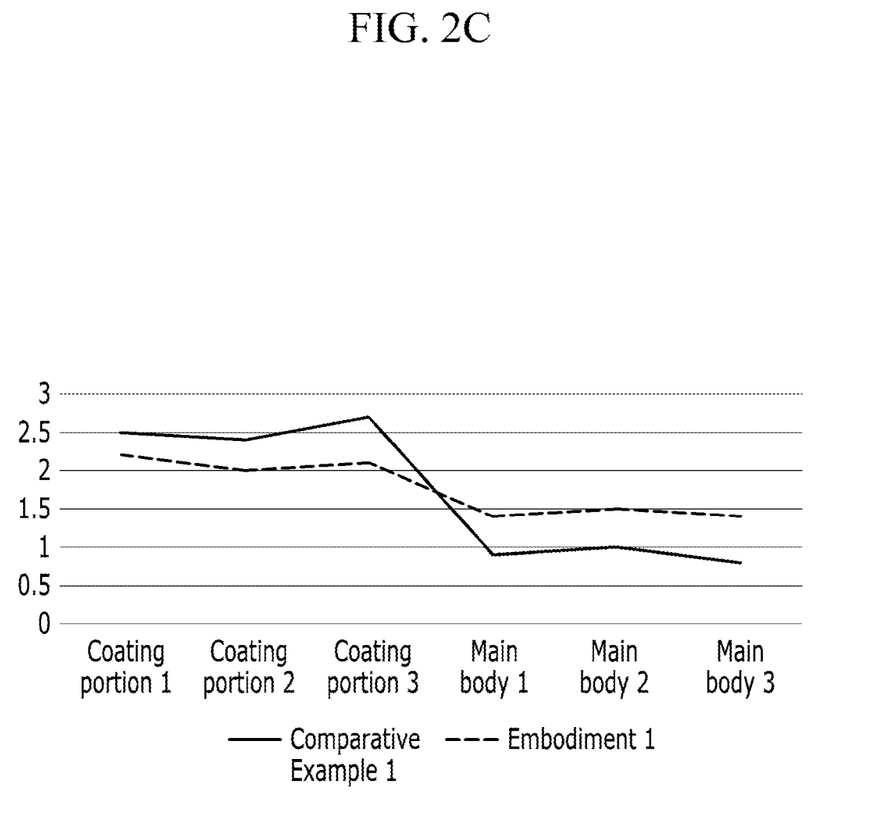

For each of the coating portion and the main body of Embodiment 1 and Comparative Example 1, the appearance color difference (*L value) and the appearance gloss were measured three times, and the results are shown in the graphs in FIG. 2A to FIG. 2C.

Referring to FIG. 2B, the appearance color difference value of the coating portion of Embodiment 1 was similar to that of the main body thereof, and the change in color

TABLE 2

| Classification | Comparative Example 1 | Comparative Example 2 | Comparative Example 3 | Comparative Example 4 | Comparative Example 5 | Embodiment 1 | Comparative Example 6 |
|---|---|---|---|---|---|---|---|
| Surface appearance | General protrusion | Rough protrusion | Very rough protrusion | Very rough protrusion | General protrusion | Fine protrusion | No protrusion (Smooth appearance) |
| Color matching with TPV base | Good | Good | Poor | Poor | Good | Good | Good |
| Wear resistance | OK (30,000 times) | OK (30,000 times) | OK (40,000 times) | OK (40,000 times) | OK (35,000 times) | OK (40,000 times) | OK (35,000 times) |
| Static friction coefficient | 0.17 | 0.19 | 0.22 | 0.25 | 0.19 | 0.13 | 0.18 |
| Dynamic friction coefficient | 0.20 | 0.24 | 0.26 | 0.28 | 0.22 | 0.15 | 0.22 |
| Lifting durability (Noise occurrence) | No occurrence | No occurrence | Noise occurrence (8,000 times) | Noise occurrence (6,500 times) | No occurrence | No occurrence | Intermittent Noise occurrence |
| Lifting durability (operation heaviness) | Occurrence (10.000 times) | Occurrence (20,000 times) | Early occurrence | Early occurrence | No occurrence | No occurrence | Occurrence (10,000 times) |

As shown in the Table 2, Embodiment 1 using the vehicle glass run slip coating composition according to the present disclosure had excellent effects in the surface appearance, the color matching with the glass run base, the wear resistance, the friction coefficient, the operation noise, and the operation heaviness, compared to Comparative Examples 1 to 6.

Particularly, Embodiment 1 using the slip coating composition according to the present disclosure containing the ultra-high molecular weight polyethylene of a specific molecular weight range formed the microprotrusions on the surface of the slip coating material, and had the most improved friction coefficient. In contrast, Comparative Examples 1 to 3 using the slip coating composition containing the ultra-high molecular weight polyethylene having the weight average molecular weight of $2\times10^6$ g/mol formed the general protrusions (embossings) or rough protrusions on the surface of the coating material, Comparative Example 5 using the slip coating composition containing the ultra-high molecular weight polyethylene having the weight average molecular weight of $5\times10^6$ g/mol and Comparative Example 6 using the slip coating composition containing the high molecular weight polyethylene having the weight average molecular weight of $0.3\times10^6$ g/mol formed the general protrusions, and thus Comparative Examples 1 to 6 were found to have a higher friction coefficient than Embodiment difference value was very small, so it can be seen that a stable color was maintained compared to Comparative Example 1. In addition, referring to FIG. 2C, Comparative Example 1 showed that the main body thereof was matte, the coating portion thereof had non-uniform gloss and had high gloss, while both the coating portion and the main body of Embodiment 1 had uniform gloss close to matte. Through this, it can be seen that the slip coating material formed of the glass run slip coating composition according to the present disclosure has improved color matching with the glass run main body.

While the present disclosure has been illustrated and described in connection with what is presently considered to be practical embodiments, it is to be understood that the disclosure may be implemented in various different forms by those of ordinary skill in the art. The present disclosure is intended to cover various modifications and equivalent arrangements included within the spirit and scope of the appended claims.

The invention claimed is:

1. A slip coating composition for a glass run of a vehicle, comprising:
   an olefin-based thermoplastic elastomer;
   polypropylene; and
   an ultra-high molecular weight polyethylene (UHMWPE) with a weight average molecular weight of $0.4\times10^6$ to $1\times10^6$ g/mol;

wherein the olefin-based thermoplastic elastomer is included in an amount of 10 to 30 wt % with respect to a total weight of the composition;

wherein the polypropylene is included in an amount of 20 to 50 wt % with respect to a total weight of the composition; and, wherein the ultra-high molecular weight polyethylene is included in an amount of 10 to 20 wt % with respect to a total weight of the composition.

2. The slip coating composition for the glass run of the vehicle of claim 1, wherein the olefin-based thermoplastic elastomer is a crosslinked thermoplastic vulcanizate (TPV).

3. The slip coating composition for the glass run of the vehicle of claim 1, wherein the composition further contains a silicone masterbatch, and the silicone masterbatch contains polyethylene and dimethylsiloxane.

4. The slip coating composition for the glass run of the vehicle of claim 3, wherein the silicone masterbatch is included in an amount of 10 to 30 wt % with respect to a total weight of the composition.

5. The slip coating composition for the glass run of the vehicle of claim 1, wherein the composition further contains a peroxide crosslinking agent.

6. The slip coating composition for the glass run of the vehicle of claim 1, wherein the composition further contains one or more of a polypropylene wax, a pigment, an ultra-violet ray blocking agent, and an anti-oxidant.

7. A slip coating material formed by co-extruding the slip coating composition according to claim 1 with a vehicle glass run base.

8. The slip coating material of claim 7, wherein the vehicle glass run base is a crosslinked thermoplastic vulcanizate (TPV)-based base.

* * * * *